(12) United States Patent
Dumont et al.

(10) Patent No.: US 12,371,755 B2
(45) Date of Patent: Jul. 29, 2025

(54) STEEL SHEET AND HIGH STRENGTH PRESS HARDENED STEEL PART HAVING EXCELLENT BENDING AND METHOD OF MANUFACTURING THE SAME

(71) Applicant: ArcelorMittal, Luxembourg (LU)

(72) Inventors: Alice Dumont, Le Ban St Martin (FR); Guillaume Stechmann, Marly (FR); Emmanuel Lucas, Metz (FR); Matthieu Salib, Maizieres-les-Metz (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 19/011,505

(22) Filed: Jan. 6, 2025

(65) Prior Publication Data

US 2025/0137082 A1 May 1, 2025

Related U.S. Application Data

(60) Division of application No. 18/811,133, filed on Aug. 21, 2024, which is a continuation of application No. PCT/IB2024/054050, filed on Apr. 25, 2024.

(30) Foreign Application Priority Data

Jun. 30, 2023 (WO) .................. PCT/IB2023/056846

(51) Int. Cl.
  *C21D 8/02* (2006.01)
  *C21D 1/18* (2006.01)
  (Continued)

(52) U.S. Cl.
  CPC ............. *C21D 9/0068* (2013.01); *C21D 1/18* (2013.01); *C21D 6/002* (2013.01); *C21D 6/005* (2013.01);
  (Continued)

(58) Field of Classification Search
  None
  See application file for complete search history.

(56) References Cited

U.S. PATENT DOCUMENTS

2014/0120365 A1 5/2014 Miyoshi et al.
2014/0370329 A1 12/2014 Nonaka et al.
(Continued)

FOREIGN PATENT DOCUMENTS

CN   111235483 A    6/2020
KR   20210050806 A  5/2021
(Continued)

OTHER PUBLICATIONS

International Search Report for corresponding PCT/IB2024/054050.
International Search Report for corresponding PCT/IB2023/056846.

*Primary Examiner* — Anthony M Liang
(74) *Attorney, Agent, or Firm* — Davidson Kappel LLC (57) ABSTRACT

A steel sheet having a chemical composition including in wt % C: 0.2-0.4%, Mn: 0.8-2.0%, Si: 0.1-0.5%, Al: 0.01-0.1%, Ti: 0.01-0.1%, B: 0.0005-0.005%, P≤0.040%, Ca≤0.01%, S≤0.006%, N≤0.01%. The steel sheet includes from the bulk to the surface of the coated steel sheet a bulk and a skin layer occupying the outermost 10% of the thickness on either side of the bulk. The bulk is topped by a skin layer occupying the outermost 10% of the thickness on either side of the bulk, the density of TiN/Ti(C,N) inclusions in the skin being smaller than 240 particles/mm$^2$ and the clustering index of MnS inclusions in the skin being lower than 110 μm/mm$^2$. This allows to manufacture hot pressed parts having a tensile strength equal to or greater than 1300 MPa and a bending angle normalized to 1.5 mm and measured in the transverse direction strictly greater than 48°.

8 Claims, 1 Drawing Sheet (51) Int. Cl.
 *C21D 6/00* (2006.01)
 *C21D 7/13* (2006.01)
 *C21D 8/00* (2006.01)
 *C21D 9/00* (2006.01)
 *C22C 38/00* (2006.01)
 *C22C 38/02* (2006.01)
 *C22C 38/04* (2006.01)
 *C22C 38/06* (2006.01)
 *C22C 38/14* (2006.01)
 *C22C 38/28* (2006.01)
 *C22C 38/32* (2006.01)

(52) U.S. Cl.
 CPC ............... *C21D 6/008* (2013.01); *C21D 7/13* (2013.01); *C21D 8/005* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/28* (2013.01); *C22C 38/32* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2015/0050519 A1 | 2/2015 | Nonaka et al. |
| 2020/0370140 A1 | 11/2020 | Takashima et al. |
| 2024/0002993 A1 | 1/2024 | Philippot et al. |
| 2024/0182996 A1 | 6/2024 | Lee et al. |
| 2024/0209485 A1 | 6/2024 | Cobo et al. |
| 2024/0218476 A1 | 7/2024 | Cobo et al. |

FOREIGN PATENT DOCUMENTS

| | | |
|---|---|---|
| RU | 2581333 C2 | 4/2016 |
| RU | 2581334 C2 | 4/2016 |
| RU | 2591905 C2 | 7/2016 |
| WO | WO2022129994 A1 | 6/2022 |
| WO | WO-2022234320 A1 * | 11/2022 |
| WO | WO2022234413 A1 | 11/2022 |
| WO | WO2022234414 A1 | 11/2022 |
| WO | WO2023022445 A1 | 2/2023 |
| WO | WO2023041953 A1 | 3/2023 |

* cited by examiner

STEEL SHEET AND HIGH STRENGTH PRESS HARDENED STEEL PART HAVING EXCELLENT BENDING AND METHOD OF MANUFACTURING THE SAME

BACKGROUND

The present disclosure relates to steel sheets and to high strength press hardened steel parts.

High strength press-hardened parts can be used as structural elements in automotive vehicles for anti-intrusion or energy absorption functions.

In such type of applications, it is desirable to produce steel parts that combine high mechanical strength and high impact resistance. Moreover, one of the major challenges in the automotive industry is to decrease the weight of vehicles in order to improve their fuel efficiency in view of the global environmental conservation, without neglecting the safety requirements.

This weight reduction can be achieved in particular thanks to the use of steel parts with a predominantly martensitic microstructure.

It is challenging to produce very high strength steels which also have a good resistance to the formation of cracks under bending. Indeed, very high strength steels tend to crack early on when submitted to a bending load. This is detrimental to the crash worthiness of a part produced with such high strength steel, because even though the material is able to withstand very high loads thanks to its high tensile strength, once cracks start to appear in the part, these cracks will quickly propagate under the continued load and the part will fail prematurely.

A purpose of the present disclosure is to address the above-mentioned challenge and to provide a press hardened steel part having a combination of high mechanical properties with a tensile strength after hot stamping above or equal to 1300 MPa and a high bending angle measured in the transverse direction great than 48° when normalized to 1.5 mm thickness.

Another purpose of the present disclosure is to provide a steel sheet that can be transformed by hot forming into such a press hardened steel part and to provide a process to manufacture such a steel sheet.

The present disclosure will now be described in detail and illustrated by examples without introducing limitations, and referring to FIG. 1, which is a schematic cross section of a steel sheet according to the present disclosure.

SUMMARY

A blank of steel refers to a flat sheet of steel, which has been cut to any shape suitable for its use. A blank has a top and bottom face, which are also referred to as a top and bottom side or as a top and bottom surface. The distance between said faces is designated as the thickness of the blank. The thickness can be measured for example using a micrometer, the spindle and anvil of which are placed on the top and bottom faces. In a similar way, the thickness can also be measured on a formed part.

Hot stamping is a forming technology which involves heating a blank up to a temperature at which the microstructure of the steel has at least partially transformed to austenite, forming the blank at high temperature by stamping it and quenching the formed part to obtain a microstructure having a very high strength. Hot stamping allows to obtain very high strength parts with complex shapes and presents many technical advantages. It should be understood that the thermal treatment to which a part is submitted includes not only the above-described thermal cycle of the hot stamping process itself, but also possibly other subsequent heat treatment cycles such as for example the paint baking step, performed after the part has been painted in order to cure the paint. The mechanical properties of hot stamped parts below are those measured after the full thermal cycle, including optionally for example a paint baking step, in case paint baking has indeed been performed.

The ultimate tensile strength is measured according to ISO standard ISO 6892-1, published in October 2009. The tensile test specimens are cut-out from flat areas of the hot stamped part. If necessary, small size tensile test samples are taken to accommodate for the total available flat area on the part.

The bending angle is measured according to the VDA-238 bending standard. For the same material, the bending angle depends on the thickness. For the sake of simplicity, the bending angle values of the present disclosure refer to a thickness of 1.5 mm. If the thickness is different than 1.5 mm, the bending angle value needs to be normalized to 1.5 mm by the following calculation where $\alpha 1.5$ is the bending angle normalized at 1.5 mm, t is the thickness, and $\alpha t$ is the bending angle for thickness t:

$$\alpha 1.5 = (\alpha t \times \sqrt{t})/\sqrt{1.5}$$

In the present disclosure, the bending angle was measured in the transverse direction, i.e. the transverse direction to the rolling direction along which the steel sheet travelled during the hot-rolling step. The bending angle was measured using a laser measurement device. The reported values are those after springback. When performing bending tests on hot stamped part, the samples are cut-out from flat areas of the part. If necessary, small size samples are taken to accommodate for the total available flat area on the part. If the rolling direction on the hot stamped part is not known, it can be determined using Electron Back-Scattered Diffraction (EBSD) analysis across the section of the sample in a Scanning Electron Microscope (SEM). The rolling direction is determined according to the intensity of the Orientation Density Function (ODF) representative of the major fibers at $\varphi 2=45°$, where $\varphi 2$ is the Euler angle as defined in "H.-J. Bunge: Texture Analysis in Materials Science-Mathematical Methods. 1st English Edition by Butterworth Co (Publ.) 1982" (see FIGS. 2.2 and 2.3 for the definition of $\varphi 2$).

The bending angle of a part is representative of the ability of the part to resist deformation without the formation of cracks.

The composition of the steel according to the present disclosure will now be described, the content being expressed in weight percent. The chemical compositions are given in terms of a lower and upper limit of the composition range, said limits being comprised within the possible composition range according to the present disclosure. In the case when preferred ranges for a given element are disclosed, the present disclosure also discloses all possible combinations of these preferred ranges for each individual element.

According to the present disclosure the carbon ranges from 0.2% to 0.4% to ensure a satisfactory strength. Above 0.4% of carbon, weldability and bendability of the steel sheet may be reduced. If the carbon content is lower than 0.2%, the tensile strength will not reach the targeted value. In a specific embodiment, the carbon ranges from 0.2% to 0.3%, in order to ensure sufficient strength while further controlling excellent weldability and bendability. In a specific embodiment, the carbon ranges from 0.2% to 0.25%, in order to ensure sufficient strength while even further controlling excellent weldability and bendability.

The manganese content ranges from 0.8% to 2.0%. Above 2.0% of addition, the risk of MnS formation is increased to the detriment of the bendability. Below 0.8% the hardenability of the steel sheet during the hot stamping process is reduced.

In a specific embodiment, the manganese content ranges from 1.0% to 1.4% in order to further improve the hardenability of the steel and further limit the formation of MnS, thus improving bendability.

The silicon content ranges from 0.1% to 0.5%. Silicon is an element participating in the hardening in solid solution. Silicon is added to limit carbides formation. Above 0.5%, silicon oxides form at the surface, which impairs the coatability of the steel. Moreover, the weldability of the part produced with said steel sheet may be reduced. In a specific embodiment, the silicon content ranges from 0.1% to 0.4% in order to further improve coatability and weldability. In a specific embodiment, the silicon content ranges from 0.15% to 0.35% in order to further harden the steel and further improve coatability and weldability.

According to the present disclosure, the Aluminum content ranges from 0.01% to 0.1% as it is a very effective element for deoxidizing the steel in the liquid phase during elaboration. Aluminum can protect boron if titanium content is not sufficient. The Aluminum content is lower than 0.1% to avoid oxidation problems and ferrite formation during press hardening. Preferably the Aluminum content ranges from 0.02% to 0.06% to further ensure good deoxidization of the steel in the liquid phase while further avoiding oxidation problems and ferrite formation during press hardening.

According to the present disclosure, the titanium content ranges from 0.01% to 0.1% in order to protect boron, which would otherwise be trapped within BN precipitates. Titanium content is limited to 0.1% to avoid excess TiN formation. In a specific embodiment, Ti content ranges from 0.02% to 0.06% in order to further protect boron while further avoiding excess TiN formation.

According to the present disclosure, the boron content ranges from 0.0005% to 0.005%. Boron improves the hardenability of the steel. The boron content is not higher than 0.005% to avoid slab breaking issues during continuous casting. In a specific embodiment, the boron content ranges from 0.002% to 0.004% in order to further ensure the hardenability of the steel and further avoid slab breaking issues.

Phosphorous is controlled to below or equal to 0.040%, because it leads to fragility and weldability issues. In a specific embodiment, the P content is controlled to below or equal to 0.020% to further avoid fragility and weldability issues.

Calcium is controlled to below or equal to 0.01% because the presence of Calcium in the liquid steel can lead to the formation of coarse inclusions which are detrimental to bendability. In a specific embodiment, the Ca content is controlled to below or equal to 0.005% to further avoid coarse inclusions issues.

Sulphur is controlled to below or equal to 0.006% because the presence of Sulphur in the liquid steel can lead to the formation of MnS precipitates which are detrimental to bendability. In a specific embodiment, the S content is controlled to below or equal to 0.005% to further avoid the formation of MnS precipitates.

Nitrogen is controlled to below 0.01% preferentially below or equal to 0.008% even more preferentially below 0.005%. The presence of Nitrogen can lead to the formation of precipitates such as TiN or TiNbCN, which are detrimental to the bendability.

Chromium is optionally added up to 0.4%. Chromium can be used to provide strength by solid solution hardening and to improve the hardenability of the steel sheet during hot stamping. Chromium is limited to 0.4% to limit costs and avoid processing issues.

Molybdenum is optionally added up to 0.3%. Molybdenum improves the hardenability of the steel. Molybdenum is limited to 0.3% to limit costs and avoid processing issues.

Niobium is optionally added up to 0.1%. Niobium improves ductility of the steel. Niobium is limited to 0.1% to limit costs and avoid processing issues.

Vanadium is optionally added up to 0.3%. Vanadium improves the hardenability of the steel. Vanadium is limited to 0.3% to limit costs and avoid processing issues.

In case one or several of the above elements are added, the following formula is further verified: Cr+Mo+Nb+V≤0.5% in order to limit costs and avoid processing issues.

In a specific embodiment, the chemical composition is further controlled so that the following condition is verified:

$$5.22*(S - Ca*32/40)*10^4 + 11,4*(Ti^2*N)*10^6 + 136.5 < 300$$

The inventors have found that this allowed to further control the inclusion population of the steel sheet and therefore further improve bendability.

The remainder of the composition of the steel is iron and impurities resulting from the elaboration process. The level of impurities resulting from the elaboration process will depend on the production route used and the level of scrap used in the steel melt. For example, when using a Basic oxygen furnace route with a low level of steel scrap (recycled steel), the level of impurities will remain very low. It is however also possible to add a high amount of scrap in the converter to the pig iron produced in the basic oxygen furnace, which will increase the level of impurities. Furthermore, when elaborating the steel using an electric furnace for example, with a very high ratio of recycled scrap steel, the level of impurities will be significantly increased. When using a high level of scrap, the level of Cu can go up to 0.25%, Ni can go up to 0.25%, Sn can go up to 0.05%, As can go up to 0.03%, Sb can go up to 0.03% and Pb can go up to 0.03%.

The microstructure of the steel sheet according to the present disclosure will now be described.

The steel sheet has a microstructure comprising in surface fraction on any analyse cross section:
  75% to 90% of ferrite,
  the rest being comprised of carbides $Fe_3C$ and hard phases such as martensite and bainite.

DETAILED DESCRIPTION

Figure 1:
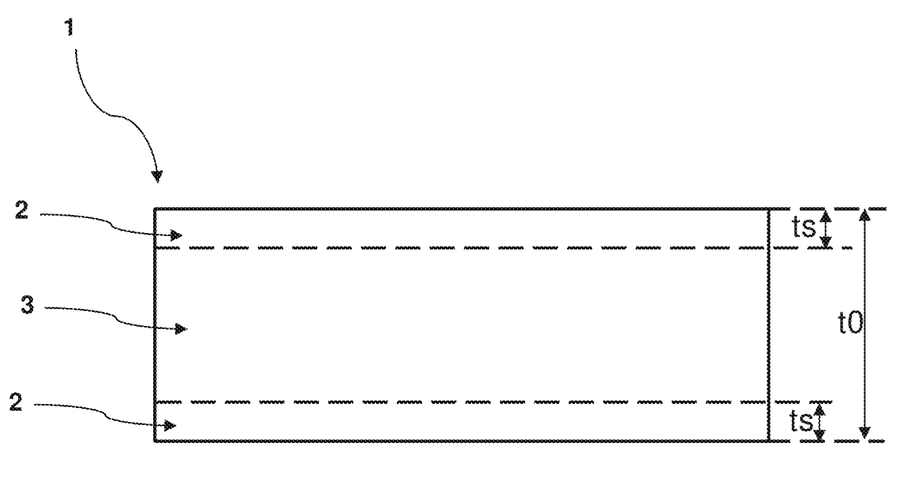
FIG. 1 shows a steel sheet according to the present disclosure.

Referring to FIG. 1, the steel sheet 1 according to the present disclosure comprises a bulk portion 3 and a top and bottom skin layer 2. The total thickness of the steel sheet 1 is t and the thickness ts of the skin layers 2 is such that ts=t0*10%. In other words, the skin layers 2 occupy the outermost 10% of the thickness on either sides of the bulk and the bulk of the steel sheet represents 80% of the steel sheet thickness.

The inventors have found that there is a correlation between the bending angle and the inclusion population in the skin portion of the steel sheet. In particular, it is possible to ensure that the normalized bending angle α1.5 in the transverse direction strictly greater than 48° by controlling that both the density of TiN/Ti(C,N) inclusions in the skin is smaller than 240 particles/mm² and that the clustering index of MnS inclusions in the skin portion of the steel is lower than 110 μm/mm².

The following is a description of the methodology that was used in order to characterize the inclusions in the steel sheet and steel parts. It should be understood that this is only one possible methodology and that other protocols can also be implemented.

The cross-sections of the steel sheet on which the inclusions are observed are taken in the rolling direction of the steel. In other words, the plane of the observed cross section has the transverse direction as its normal direction.

The inclusions present in the steel sheet have been characterized using a Scanning Electron Microscope (SEM) with Field Effect Gun (FEG). A Tescan Mira 3 SEM was used at a 14 kV power setting. This allows to detect particles as small as 0.5 μm. Using a FEG SEM setup allows to obtain stable images with an excellent resolution over a long period of time, which can be necessary for completing image analysis over broad areas—using a FEG SEM setup it is possible to acquire image fields during up to 48 hours which can be necessary for multi samples analysis. Furthermore, the inclusions were analysed using Energy Dispersive Spectrometry (EDS). A 120 mm² Bruker EDS probe having large active surface was used in order to detect light elements (O, N) and to get a high count rate and thus allow a precise quantification. The phi-rho-Z method was used to obtain an accurate quantification.

The Automated Steel Cleanliness Analysis Tool (ASCAT) of the RJ Lee group is used to pilot the SEM & associated EDS, based on Computer Control Scanning Electron Microscopy technologies. Six individual samples can be analysed in the same batch. The sample surface is divided in three areas (Top skin, bottom skin, bulk, as described previously). Each area is divided in fields. In each field, inclusions are detected. In order to detect fine particles, the scanning pixel size is set to the very low value of 0.11 μm. This is in order to reduce matrix noise of SEM images. As will be seen, only Objects with diameters over 0.5 μm are actually taken into account. A first selection of objects, which will be termed particles, is made by selecting objects forming a solid and having a grey level, on a scale of 0 to 255, either below 150 or above 220 (the extreme values are excluded).

A zoom is then made on each individual particle to catch their morphological features and to perform an EDS analysis. A database of all particles is created using ASCAT and taking into account, for all acquired images, the chemical and morphological features of all analysed particles.

Out of the set of all analysed particles, only the ones having a size greater than 0.5 μm and an iron content below 80% are retained for the subsequent analysis and will be termed inclusions—the other particles are considered to be part of the matrix and not relevant for the subsequent analysis.

Using the information of the EDS probe, each inclusion is then classified in one of the following families: TiN, alumina, Complex oxides, Oxysulfide particles, MnS and others. For example, table 1 details the precise rules that were used by the inventors to classify MnS and TiN/Ti(C, N) inclusions. Oxygen quantification is made possible by high performance EDS detectors. The oxygen level is checked in order to separate TiN from TiO2 and MnS from complex oxysulfide inclusions.

TABLE 1

| Criteria in weight % of Ti, M, S O, Nb to classify inclusions | | | | |
|---|---|---|---|---|
| | Ti (wt %) | Mn (wt %) | S (wt %) | O (wt %) | Nb (wt %) |
| TiN/Ti(C, N) | Ti > 2% And Ti > (Mg + Al + Ca + Mn + Si) | | | O < 5% | Ti/(Ti + Nb) > 0.9% |
| MnS | | Mn > 4%, And (Mn + S) > (Mg + Al + Ca + Si + Nb + Ti) | S > 2% | O < 5% | |

For each inclusion family the following characteristics are then calculated:
  average diameter in microns,
  density in number of inclusions per mm².

The clustering index calculation method is based on the DBSCAN (for Density-Based Spatial Clustering of Applications with Noise) algorithm, as detailed in the article "A density-based algorithm for discovering clusters in large spatial databases with noise", Ester, Martin; Kriegel, Hans-Peter; Sander, Jörg; Xu, Xiaowei (1996), in Proceedings of the Second International Conference on Knowledge Discovery and Data Mining (KDD-96). AAAI Press. pp. 226-231.

The determination of the clustering index takes 2 parameters: Max_distance and Min_points. A cluster is characterized by the following features:
  it comprises only particles of the same type,
  in a given cluster, the inclusions are all at a distance inferior to Max_distance from at least one other inclusion,
  it comprises a number of individual inclusions equal to or greater than Min_points.

For the present disclosure, the inventors have found that a good detection of clusters is obtained with a maximum distance Max_distance of 30 μm and a minimum number of inclusions per cluster Min_points of 4.

The length L of a given cluster is computed in the following way:
  the convex hull of the cluster is first determined using a known algorithm (see for example the chapter "Convex Hulls: Basic Algorithms" In: Computational Geometry, Preparata, F. P., Shamos, M. I., 1985, Texts and Monographs in Computer Science. Springer, New York, NY)
  The maximum Feret diameter of said convex hull, which will be termed Dmax, is then determined and the Feret diameter taken in the perpendicular direction to Dmax, which will be termed Dperp, is also determined. Information on Feret diameter measurement is available for example in "Particle Size Measurements: Fundamentals, Practice, Quality" Springer. Henk G. Merkus (1 Jan. 2009).

The length L of said cluster is calculated as $$L = \sqrt{D\max^2 + Dperp^2}$$

For each type of inclusion an average length of all clusters L_average is computed.

The clusters density C_density of a given type of inclusion is the number of clusters per mm².

The cluster index C_index for a given type of inclusion is defined as the product of the average length of clusters by their density C_index=L_average*C_density. The cluster index is expressed in μm/mm². The inventors have found that said cluster index allows to compare samples having different characteristics using a unique number and that it is well correlated to the bending behaviour of said samples.

The steel sheet according to the present disclosure can be produced by any appropriate manufacturing method and the man skilled in the art can define one. It is however preferred to use the method according to the present disclosure comprising the below described steps.

In the following description, the term ladle refers to the vessel used to contain the liquid steel during the refining process. The refining process is referred to as the step at which the final chemical composition and temperature of the melt is adjusted before casting the steel into its first solidified form (for example before casting it into slabs, which will subsequently be hot rolled).

In order to successfully control the inclusion population of the steel, the following process can for example be implemented:

The liquid steel is tapped into the ladle from the previous steelmaking process step. For example, in the case of an electric arc furnace production route, said previous process step is the electric arc furnace process itself. For example, in the case of a Blast furnace and converter process (or in the case of a Direct Reduced Iron and convertor process), said previous process step is the converter.

The Sulphur content of the liquid steel before the refining step is measured, for example by taking a sample of said liquid steel and analysing it using a spark spectrometer. Said sulphur content is for example measured by sampling directly the liquid steel in the ladle or by taking a sample when the liquid steel is being tapped into said ladle. Said sulphur content before the refining step, measured in weight %, will be termed S_start in the following description.

Aluminium is added to the ladle at the beginning of the refining process in order to deoxidise the liquid steel. Said Al addition is for example performed at the same time as the steel is being tapped into the ladle—advantageously this allows to save time and therefore increase productivity and ensure that the liquid steel stays sufficiently hot. The amount of Al added in the liquid steel at the beginning of the refining process, expressed in kg of aluminium per ton of liquid steel (kg/ton), will be termed Al_added in the following description.

In a subsequent optional step, for example if the liquid steel temperature is too low or if it is foreseen that the waiting time between the end of the refining step and the subsequent process (e.g. continuous casting) warrants it, the liquid steel is reheated by aluminothermic heating. This is performed by adding a determined amount of aluminium and jointly blowing into the liquid steel a determined amount of oxygen, corresponding to the stoichiometric ratio necessary to form $Al_2O_3$ with the added aluminium. The strongly exothermal reaction between Al and $O_2$ allows to increase the temperature of the liquid steel. The amount of $O_2$ injected during this optional step will be termed $O_2$_inj and is expressed in Normal cubic meters of $O_2$ per ton of liquid steel ($Nm^3$/ton). Since there is a direct stochiometric relationship between the $O_2$_inj and the associated Al injection for aluminothermic re-heating, said amount of injected Al for aluminothermy will not be considered separately in the current description. It should be noted that said injected Al for aluminothermy is distinct from the previously mentioned Al_added.

The slag composition above the melt is adjusted by adding the appropriate amount of minerals in order to ensure that the ratio % CaO/% $Al_2O_3$ of the slag is above 1, that the amount of slag per ton of liquid steel is at least 10 kg/ton of liquid steel and that the slag remains liquid in order to promote chemical exchanges with the steel, to be able to access the steel below the slag and to be able to tap the steel and/or the slag separately (the liquid state of the slag is verified visually and/or using thermodynamic rules based on its composition and temperature), In a subsequent step, the liquid steel is stirred by blowing an inert gas, for example by blowing Ar, within the liquid steel. This is done in order to promote the exchanges between the liquid steel and the slag, which will allow to lower the sulphur content of the liquid steel.

In a further step, Ca is added to the ladle in order to globularise the inclusions present within the liquid steel. For example, Ca is added in the form of Silicon Calcium (SiCa) or in the form of Ferro-calcium (FeCa), or as pure Calcium. For example, said addition is performed by adding SiCa or FeCa to the ladle in the form of a cored wire—advantageously, this allows to easily control the amount of Ca added by controlling the length and the injection speed of cored wire inserted into the melt. The amount of Ca added in the liquid steel, measured in weight % within the liquid steel, will be termed Ca_added in the following description.

Considering the above described process, the inventors have found that a satisfactory level of inclusions to reach the desired bending level after hot stamping can be obtained by controlling the above described levels of measured Sulphur at the beginning of the refining process (S_start measured in wt %), Al addition at the beginning of the refining process (Al_added measured in kg/ton), Ca addition during the refining process (Ca-added measured in kg/ton) and volume of $O_2$ blowing ($O_2$_inj measured in Nm3/ton) in order to verify that the combination below (which will be termed C1 in the rest of the description) stays below a given cut-off value:

$$217.8 - 315.1 * \text{Ca\_added} + \\ 41.5 * O_2\_\text{inj} + 18700 * \text{S\_start} - 40 * \text{Al\_added} \tag{C1}$$

In effect, the specific cut-off value below which the combination C1 needs to be controlled will depend on the specific industrial setup which is used to produce the steel. It will depend on the production route in the steel shop, the geometric configuration of the ladles that are used to process the liquid steel, the equipment used to add the different additions, the oxygen blowing configuration etc.

In order to determine the relationship between these parameters for a given industrial equipment and production route, it is recommended to apply the following method:

Several heats are performed using the chemical composition ranges described previously.

Said heats are processed using different refining process parameters, in particular different levels of measured Sulphur at the beginning of the refining process, Al addition at the beginning of the refining process, Ca addition during the refining process and volume of $O_2$ blowing. The ranges of tested refining process parameters are chosen so as to be representative of the industrial variation of these parameters. For example, a set of 6 different heats with 6 different sets of refining process parameters is chosen. For example, a set of 8 different heats with 8 different sets of refining process parameters is chosen.

Said heats are processed according to the below described industrial route and the inclusion population of the steels are characterized using the above-described method.

The density of TiN/Ti(C,N) inclusions in the skin and the clustering index of MnS inclusions in the skin portion of the steel as well as the associated refining process parameters are then recorded. The combination C1 of said refining process parameters is computed. As a general trend, it will be seen that the higher said combination C1 is, the higher the density of TiN/Ti(C, N) inclusions in the skin and the clustering index of MnS inclusions in the skin portion of the steel will be.

Using the above-described set of data associating skin inclusions characteristics and refining process parameters, a cut-off value is determined below which both the density of TiN/Ti(C,N) inclusions in the skin is smaller than 240 particles/mm$^2$ and the clustering index of MnS inclusions in the skin portion of the steel is lower than 110 μm/mm2. Said cut-off value of combination C1 will determine how to control the refining process for the specific industrial installation that is being considered. By controlling C1 below said cut-off value, it will be possible to produce steel sheets having both a density of TiN/Ti(C,N) inclusions in the skin smaller than 240 particles/mm$^2$ and a clustering index of MnS inclusions in the skin portion of the steel lower than 110 μm/mm$^2$. It will thus be possible to reach the associated excellent bending level of strictly more than 48° normalized bending angle α1.5 in the transverse direction.

For example, in the case of the specific industrial installations upon which the inventors performed experiments, said cut-off value is equal to 270.

After the liquid steel refining step, the method for manufacturing the steel sheet according to the present disclosure preferably comprises the following steps:

continuous casting of the liquid steel into a semi-product suitable to be hot-rolled. During the casting step particular care should be taken to avoid oxygen pick-up and therefore higher inclusions level in the semi-product. For example, in the case of a continuous casting process in which the semi-products are slabs produced in a continuous sequence by casting in a mold the product of multiple heats poured into a tundish, specific refractories and linings can be used in the tundish, specific allocation rules can be used for first of sequence slabs and transient slabs between two different heats, etc.

The semi product is then optionally reheated at a temperature comprised from 1150° C. to 1300° C.

The steel sheet is then hot rolled at a finish hot rolling temperature comprised from 800° C. to 950° C.

The hot-rolled steel is then cooled and coiled at a temperature $T_{coil}$ lower than 670° C., and optionally pickled to remove oxidation.

The coiled steel sheet is then optionally cold rolled to obtain a cold rolled steel sheet. The cold-rolling reduction ratio preferably ranges from 20% to 80%. Below 20%, the recrystallization during subsequent heat-treatment is not favored, which may impair the ductility of the steel sheet. Above 80%, there is a risk of edge cracking during cold rolling.

In an embodiment of the present disclosure the steel sheet is heated in an annealing furnace to a soaking temperature comprised from 700° C. to 850° C. and maintained at said soaking temperature for a soaking time comprised from 10 seconds to 20 minutes.

In an embodiment of the present disclosure, the thus annealed steel sheet is cooled to a temperature range from 400° C. to 700° C. and further coated with a metallic coating. Said metallic coating is for example an aluminum based metallic coating comprising at least 50% of aluminum in weight. Said metallic coating is for example a zinc based metallic coating comprising at least 50% of zinc in weight.

In an embodiment of the present disclosure, the steel sheet is then cooled to room temperature.

In summary, the above-described process comprises preferably the following successive steps:

Producing a liquid steel having the above-described chemical composition, wherein during the liquid steel refining phase the levels of measured Sulphur at the beginning of the refining process, Al addition at the beginning of the refining process, Ca addition during the refining process and volume of $O_2$ blowing is controlled to verify that the combination 217.8–315.1*Ca_added+41.5*$O_2$_inj+18700*S_start–40*Al_added (C1) stays below a pre-determined cut-off value. Said cut-off value having been determined for the specific industrial equipment which is being used so that when C1 is below the cut-off value, the density of TiN/Ti(C,N) inclusions in the skin is smaller than 240 particles/mm$^2$ and the clustering index of MnS inclusions in the skin portion of the steel is lower than 110 μm/mm$^2$.

casting said liquid steel to obtain a semi-product able to be hot-rolled, optionally reheating the semi-product at a temperature $T_{reheat}$ comprised from 1100° C. to 1300° C., hot rolling the semi-product at a finish hot rolling temperature comprised from 800° C. to 950° C.

coiling the hot rolled steel sheet at a coiling temperature $T_{coil}$ lower than 670° C. to obtain a coiled steel sheet, optionally pickling the coiled steel sheet, optionally cold rolling the coiled steel sheet with a reduction ratio ranging from 20% to 80% to obtain a cold rolled steel sheet optionally heating the hot rolled steel sheet or the cold rolled steel sheet up to a soaking temperature comprised from 700° C. to 850° C. and maintaining the steel sheet at said temperature for a soaking time comprised from 10 seconds to 20 minutes, to obtain an annealed steel sheet, optionally cooling said annealed steel sheet to a temperature range from 400° C. to 700° C., optionally coating the annealed steel sheet with a metallic coating optionally cooling the coated steel sheet to room temperature.

The press part manufacturing process and ensuing pressed part characteristics will now be detailed.

A steel blank is cut out of the steel sheet according to the present disclosure and heated in an austenitizing furnace. Preferably, the steel blank is heated to a temperature comprised from 880° C. to 950° C. during 10 seconds to 15 minutes to obtain a heated steel blank. The heated blank is then transferred to a forming press before being hot formed and die-quenched to obtain a pressed part.

Optionally, the hot stamped part is further submitted to a paint baking step in which the part is heated to a temperature between 150° C. and 250° C. for a duration of 10 minutes to 2 hours.

The microstructure of the pressed part comprises in surface fraction on any analysed cross-section, more than 95% of martensite and less than 5% of bainite+ferrite. Furthermore, the pressed part according to the present disclosure comprises a bulk portion and a top and bottom skin layer, wherein the skin layers occupy the outermost 10% of the thickness on either side of the bulk. Said skin layer has a density of TiN/Ti(C,N) inclusions smaller than 240 particles/mm$^2$ and a clustering index of MnS inclusions in the skin portion of the steel lower than 110 µm/mm$^2$.

The pressed part according to the present disclosure has a tensile strength above 1300 MPa, preferably above 1350 MPa, preferably above 1400 MPa, and a normalized bending angle α1.5 in the transverse direction strictly greater than 48°. Such a high tensile strength and high bending angle confer to said part a very good mechanical resistance, especially in the case of a crash. These characteristics afford a very good energy absorption capacity and anti-intrusion capacity thereby increasing the safety of the vehicle.

The present disclosure will be now illustrated by the following examples, which are by no way limitative.

11 different samples were tested coming from 11 different heats A, B, C, D, E, F, G, H, I, J and K of steel produced using an industrial production route. Samples I1, I2, I3, I4, I5, I6 and I7 are according to the present disclosure, samples R1, R2, R3 and R4 are reference samples.

All the produced samples have followed the same industrial production process in the steel shop. All samples have been coated after annealing using an AlSi based coating containing 8-12 wt % Si, 2-4 wt % Fe, the balance being Al.

TABLE 2

Sample composition
The tested compositions are gathered in the following table wherein the element contents are expressed in weight percent, the remainder of the composition being iron and unavoidable impurities resulting from the elaboration process:

| Heat reference | C % | Mn % | Si % | Al % | Ti % | B % | P % | Ca % | S | N % | Cr % | 5.22* (S—Ca *32/40) *10$^4$ + 11.4* (Ti$^2$ *N) *10$^6$ + 136.5 |
|---|---|---|---|---|---|---|---|---|---|---|---|---|
| A | 0.2 | 1.2 | 0.2 | 0.03 | 0.04 | 0.003 | 0.013 | 0.002 | 0.002 | 0.005 | 0.2 | 248 |
| B | 0.2 | 1.2 | 0.3 | 0.03 | 0.04 | 0.003 | 0.014 | 0.002 | 0.001 | 0.004 | 0.2 | 178 |
| C | 0.2 | 1.2 | 0.3 | 0.03 | 0.04 | 0.002 | 0.013 | 0.002 | 0.002 | 0.005 | 0.2 | 248 |
| D | 0.2 | 1.2 | 0.2 | 0.03 | 0.04 | 0.003 | 0.011 | 0.002 | 0.002 | 0.002 | 0.2 | 193 |
| E | 0.2 | 1.2 | 0.3 | 0.03 | 0.04 | 0.003 | 0.015 | 0.001 | 0.001 | 0.005 | 0.2 | 238 |
| F | 0.2 | 1.2 | 0.3 | 0.04 | 0.04 | 0.003 | 0.016 | 0.001 | 0.001 | 0.004 | 0.2 | 219 |
| G | 0.2 | 1.2 | 0.2 | 0.05 | 0.03 | 0.003 | 0.013 | 0.003 | 0.002 | 0.004 | 0.2 | 156 |
| H | 0.2 | 1.2 | 0.3 | 0.04 | 0.04 | 0.003 | 0.013 | 0.001 | 0.002 | 0.007 | 0.2 | 326 |
| I | 0.2 | 1.2 | 0.2 | 0.05 | 0.04 | 0.003 | 0.010 | 0.000 | 0.002 | 0.004 | 0.2 | 313 |
| J | 0.2 | 1.2 | 0.2 | 0.04 | 0.03 | 0.002 | 0.011 | 0.001 | 0.004 | 0.006 | 0.2 | 365 |
| K | 0.2 | 1.2 | 0.2 | 0.04 | 0.03 | 0.002 | 0.011 | 0.001 | 0.004 | 0.006 | 0.2 | 365 |

TABLE 3

Steel shop process parameters, density of TiN/Ti(C, N) inclusions in the skin and clustering index of MnS inclusions in the skin
The following process parameters were applied in the steel shop and the following density of TiN/Ti(C, N) inclusions in the skin and clustering index of MnS inclusions in the skin portion of the steel were observed - the underlined values are not according to the present disclosure:

| Sample reference | heat reference | S_start (wt %) | Al_added (kg/ton) | Ca_added (kg/ton) | O2_inj (Nm$^3$/ton) | C1* | Skin layer MnS clustering index (µm/mm$^2$) | Skin layer TiN/Ti(C, N) density (nb of particles/mm$^2$) |
|---|---|---|---|---|---|---|---|---|
| I1 | A | 0.005 | 2.500 | 0.138 | 1.439 | 227 | 12 | 207 |
| I2 | B | 0.007 | 1.939 | 0.153 | 0.000 | 223 | 8 | 165 |
| I3 | C | 0.007 | 2.438 | 0.137 | 1.171 | 257 | 12 | 187 |
| I4 | D | 0.006 | 1.768 | 0.153 | 0.000 | 211 | 5 | 146 |
| I5 | E | 0.005 | 1.349 | 0.154 | 0.000 | 209 | 21 | 214 |
| I6 | F | 0.005 | 1.742 | 0.153 | 0.000 | 195 | 2 | 197 |
| I7 | G | 0.006 | 2.387 | 0.236 | 0.000 | 163 | 11 | 173 |
| R1 | H | 0.010 | 2.027 | 0.139 | 0.000 | 285 | 8 | 246 |
| R2 | I | 0.008 | 2.439 | 0.000 | 0.993 | 305 | 146 | 193 |

TABLE 3-continued

Steel shop process parameters, density of TiN/Ti(C, N) inclusions in the skin and clustering index of MnS inclusions in the skin
The following process parameters were applied in the steel shop and the following density of TiN/Ti(C, N) inclusions in the skin and clustering index of MnS inclusions in the skin portion of the steel were observed - the underlined values are not according to the present disclosure:

| Sample reference | heat reference | S_start (wt %) | Al_added (kg/ton) | Ca_added (kg/ton) | O2_inj (Nm³/ton) | C1* | Skin layer MnS clustering index (μm/mm²) | Skin layer TiN/Ti(C, N) density (nb of particles/mm²) |
|---|---|---|---|---|---|---|---|---|
| R3 | J | 0.010 | 2.458 | 0.122 | 1.407 | 332 | <u>144</u> | 202 |
| R4 | K | 0.010 | 2.458 | 0.122 | 1.407 | 332 | <u>173</u> | 215 |

*C1 = 217.8-315.1*Ca_added + 41.5*O$_2$_inj + 18700*S_start − 40*Al_added

As can be seen, in the tested industrial conditions, the density of TiN/Ti(C,N) inclusions in the skin can be controlled to less than 240 particles/mm² and the clustering index of MnS inclusions in the skin portion of the steel to lower than 110 μm/mm² by ensuring that the refining process parameters are appropriately controlled to keep C1 lower than 270. As previously explained, this cut-off value of 270 is specific to the industrial setup on which the trials were performed and the appropriate cut-off factor for a given industrial setup will need to be determined, for example by following the above-described methodology.

TABLE 4 further process conditions
The following process parameters were applied along the production route:

| Sample ref | Slab reheat T (° C.) | Rolling T (° C.) | Coiling T (° C.) | Cold rolling red. rate (%) | Soaking Temp. (° C.) | Soaking time (s) | hot forming austenit. T (C) | hot forming austenit. time (s) | Paint baking T (° C.) | Paint baking time (min) |
|---|---|---|---|---|---|---|---|---|---|---|
| I1 | 1235 | 889 | 537 | 60 | 756 | 92 | 900 | 360 | 170 | 20 |
| I2 | 1241 | 891 | 532 | 59 | 760 | 90 | 900 | 360 | 170 | 20 |
| I3 | 1238 | 887 | 524 | 58 | 762 | 96 | 900 | 360 | 170 | 20 |
| I4 | 1198 | 867 | 562 | 57 | 755 | 94 | 900 | 360 | 170 | 20 |
| I5 | 1211 | 862 | 535 | 57 | 757 | 90 | 900 | 360 | 170 | 20 |
| I6 | 1257 | 841 | 537 | 52 | 762 | 74 | 900 | 380 | 170 | 20 |
| I7 | 1220 | 875 | 551 | 54 | 751 | 43 | 900 | 400 | 170 | 20 |
| R1 | 1220 | 888 | 577 | 54 | 752 | 42 | 900 | 405 | 170 | 20 |
| R2 | 1248 | 877 | 554 | 60 | 751 | 38 | 900 | 380 | 170 | 20 |
| R3 | 1209 | 896 | 580 | 52 | 750 | 34 | 900 | 410 | 170 | 20 |
| R4 | 1209 | 857 | 548 | 52 | 751 | 34 | 900 | 410 | 170 | 20 |

TABLE 5 microstructure, bending angles and tensile strength
The following microstructures (in surface fraction), bending angles, bending angle anisotropies and tensile strength were measured on the samples, the underlined values are not according to the present disclosure:

| Sample ref | Steel sheet Thickness (mm) | Steel sheet μstructure | Hot stamped part Yield Strength (MPa) TD | Tensile Strength (MPa) TD | α1.5 bending angle normalized to 1.5 mm (TD) | Hot stamped part μstructure |
|---|---|---|---|---|---|---|
| I1 | 1.3 | 75%-90% ferrite. the rest being Fe$_3$C. martensite and bainite | 1210 | 1520 | 51 | 100% martensite |
| I2 | 1.3 | | 1190 | 1485 | 53 | |
| I3 | 1.2 | | 1186 | 1485 | 55 | |
| I4 | 1.2 | | 1204 | 1506 | 50 | |
| I5 | 1.3 | | 1153 | 1462 | 50 | |
| I6 | 1.4 | | 1216 | 1525 | 53 | |
| I7 | 1.6 | | 1192 | 1509 | 49 | |
| R1 | 1.7 | | 1150 | 1474 | <u>46</u> | |
| R2 | 1.4 | | 1185 | 1490 | <u>47</u> | |
| R3 | 1.7 | | 1142 | 1463 | <u>48</u> | |
| R4 | 1.7 | | 1144 | 1474 | <u>44</u> | |

Table 5 shows that the samples according to the present disclosure have a tensile strength above 1300 MPa in the transverse direction while having a normalized bending angle α1.5 measured in the transverse direction strictly greater than 48°. On the other hand, the reference samples, while having comparable tensile strength levels above 1300 MPa, all have a normalized bending angle α1.5 measured in the transverse direction equal to or lower than 48°.

The inventors have found that this very good level of bendability is correlated to the density of TiN/Ti(C,N) inclusions in the skin and the clustering index of MnS inclusions in the skin portion of the steel.

When the clustering index of MnS inclusions in the skin is equal to or greater than 110 μm/mm$^2$, the bending angle is diminished, such as is the case for reference samples R1, R2 and R3 which all have clustering index of MnS inclusions in the skin greater than or equal to 110 μm/mm$^2$ and a 1.5 mm normalized bending angle in the transverse direction equal to or lower than 48°.

When the density of TiN/Ti(C,N) inclusions in the skin is equal to or greater than 240 μm/mm$^2$, the bending angle is diminished, such as is the case for reference sample R1 which has a density of TiN/Ti(C,N) inclusions in the skin of 246 μm/mm$^2$ and exhibits a bending angle normalized to 1.5 mm in the transverse direction of 46° or less.

By controlling the skin inclusion population in the above-described ranges, the produced steel sheet allows to produce hot stamped parts having very good, robust and stable crash worthiness for use for example in the automotive industry.

What is claimed is:

1. A press hardened steel part, the steel part having a composition comprising, by weight percent:

$C: 0.2 - 0.3\%$ $Mn: 0.8 - 2.0\%$ $Si: 0.1 - 0.5\%$ $Al: 0.01 - 0.1\%$ $Ti: 0.01 - 0.1\%$ $B: 0.0005 - 0.005\%$ $P \leq 0.040\%$ $Ca \leq 0.01\%$ $S \leq 0.006\%$ $N \leq 0.01\%$ and comprising optionally:

$CR \leq 0.4\%$ $Mo \leq 0.3\%$ $Nb \leq 0.1\%$ $V \leq 0.3\%$ wherein Cr+Mo+Nb+V≤0.5%
a remainder of the composition being iron and unavoidable impurities resulting from an elaboration process;
said steel part having a microstructure comprising, in surface fraction, more than 95% of martensite and up to 5% of bainite or ferrite;
said steel part comprising from a bulk to a surface of the steel part:
a bulk
the bulk being topped by a skin including a top skin layer and a bottom skin layer occupying an outermost 10% of a thickness on either sides of the bulk, a density of TiN/Ti(C,N) inclusions in said skin being smaller than 240 particles/mm$^2$ and a clustering index of MnS inclusions in said skin being lower than 110 μm/mm$^2$.

2. The press hardened steel part according to claim 1, wherein the composition comprises, by weight percent:
C: 0.2-0.25%, and/or
Mn: 1.0-1.4%, and/or
Si: 0.1-0.4%, and/or
Al: 0.02-0.06%, and/or
Ti: 0.02-0.06%, and/or
B: 0.002-0.004%, and/or
P≤0.020%, and/or
Ca≤0.005%, and/or
S≤0.005%, and/or
N≤0.008%.

3. The press hardened steel part according to claim 1, wherein the chemical composition further respects the following condition, all elements being expressed in weight %:
$5.22*(S-Ca*32/40)*10^4+11$, $0.4*(Ti^2*N)*10^6+136.5<300$.

4. The press hardened steel part according to claim 1, wherein the press hardened steel part has a tensile strength TS measured in a transverse direction of at least 1300 MPa and a bending angle normalized to 1.5 mm and measured in the transverse direction strictly greater than 48°.

5. The press hardened steel part according to claim 4, wherein the press hardened steel part has a tensile strength TS of at least 1350 MPa.

6. The press hardened steel part according to claim 5, wherein the press hardened steel part has a tensile strength TS of at least 1400 MPa.

7. The press hardened steel part according to claim 2, wherein the composition comprises, by weight percent:

Si: 0.15-0.35%.

8. The press hardened steel part according to claim 2, wherein the composition comprises, by weight percent:

N≤0.005%.

* * * * *